Nov. 10, 1959    H. P. TROENDLY ET AL    2,912,086
COMBINED ONE-WAY CLUTCH AND BEARING
Filed March 25, 1957
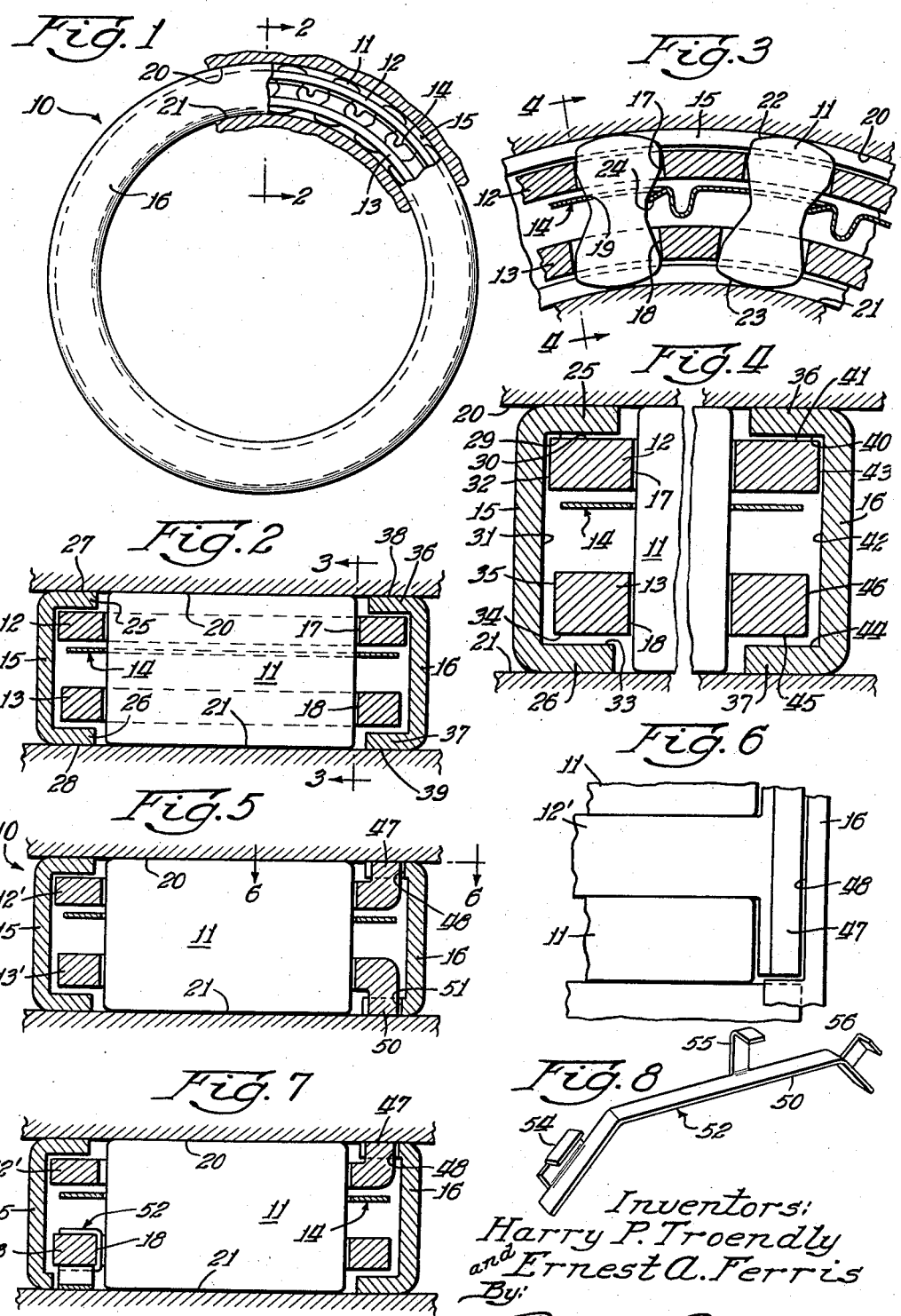
Inventors:
Harry P. Troendly
and Ernest A. Ferris
By: Donald W. Banner Atty.

United States Patent Office 2,912,086
Patented Nov. 10, 1959

2,912,086

COMBINED ONE-WAY CLUTCH AND BEARING

Harry P. Troendly, La Grange Park, and Ernest A. Ferris, Downers Grove, Ill., assignors to Borg-Warner Corporation, Chicago, Ill., a corporation of Illinois Application March 25, 1957, Serial No. 648,291

6 Claims. (Cl. 192—45.1)

This invention relates to combined bearings and one-way engaging devices, and more particularly to one-way clutches of the tiltable sprag type, effective to transmit torque in one direction only, in combination with bearing means.

One-way engaging devices or over-running clutches are commonly found in the transmissions of automotive vehicles and more generally in transmissions of the automatic type. These clutches are normally located within cavities provided for them between an inner and an outer race and are frequently retained in axial position with respect to these races by bearings disposed axially on opposite sides of each clutch.

The prior art type of one-way engaging device had several operational deficiencies. One such deficiency was that some of the engaging elements would tend to unlock when the clutch was subjected to vibration of substantial amplitude or when the inner or outer races were slightly eccentric. A result of this deficiency was that an excess load would be placed upon the elements which remained engaged causing excess wear between the engaged elements and the races. This deficiency has been overcome by the general sprag type of clutch disclosed in copending application No. 374,534 of Troendly, et al., filed September 11, 1953, now Patent No. 2,824,636, dated February 25, 1958, and entitled, "One-Way Clutch."

The present invention is particularly advantageous in applications where rigid space limitations are established, and where maximum clutch engaging capacity is necessary for a given size of clutch, to the end that a larger capacity clutch may be utilized in a given clutch cavity.

In the operation of a one-way clutch of the tiltable sprag type, it is essential that the concentric relation of the races be maintained within close tolerance. This tolerance is frequently determined by bearings disposed at the opposite axially facing sides of the clutch. In addition, with double cage sprag type clutches, the relation between the sprags and the cages must be maintained as desired. To accomplish this relation, clutches of this type are commonly provided with flanges on the inner and outer cages enclosing the tiltable sprags. The function of these flanges is to maintain the cages in a concentric relationship with respect to the races and thereby insure uniform engagement of the sprags around the entire periphery of the clutch.

It is an object of the present invention to provide a combined bearing and one-way clutch of the tiltable sprag type having incorporated therewith a pair of annular bearings for simultaneously spacing the races and the cages that hold the tiltable sprags.

It is a further object to provide bearing means for use with a one-way clutch comprising a pair of annular bearings generally U-shaped in cross section and so formed as to allow sprags of maximum axial length to be incorporated within a particular clutch cavity.

The invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

Fig. 1 is a view, partly in section, of a preferred construction of a device embodying the principles of the present invention;

Fig. 2 is an enlarged sectional view taken on line 2—2 of Fig. 1;

Fig. 3 is a fragmentary sectional view taken on line 3—3 of Fig. 2;

Fig. 4 is an enlarged sectional view taken on line 4—4 of Fig. 3;

Fig. 5 is a view, partly in section, of a modified construction of a device embodying the principles of the present invention;

Fig. 6 is a fragmentary sectional view taken on line 6—6 of Fig. 5;

Fig. 7 is a view, partly in section, of another modified construction of a device embodying the principles of the present invention; and Fig. 8 is a side view of a drag spring to be incorporated in the modification shown in the modification shown in Fig. 7.

Like characters of reference designate like parts in the several views.

Referring now to the drawings, there is illustrated a one-way clutch 10 embodying the principles of the present invention and comprising a plurality of tiltable sprags 11, an outer annular rigid cage 12, an inner annular rigid cage 13, and an annular resilient wrinkled spring ribbon 14. Adjacent the axially facing sides of the clutch 10 are a pair of annular bearings 15 and 16, to be described more fully hereinafter. The cages 12 and 13 have apertures 17 and 18, respectively, through which the sprags 11 radially extend; the circumferentially facing sides of the sprags 11 and apertures 17 and 18 are so constructed and arranged as to remain substantially in contact throughout the tilting range of the sprags 11. The wrinkled spring ribbon 14 is interposed between the outer cage 12 and the inner cage 13 and has apertures 19 through which the sprags 11 extend. The clutch 10, with the bearings 15 and 16, is disposed between an outer race having a cylindrical surface 20 and an inner race having a cylindrical surface 21.

Each of the sprags 11 has a pair of eccentric cylindrical wedging surfaces 22 and 23 for engaging the outer race surface 20 and the inner race surface 21, respectively. The wrinkled spring ribbon 14 has a plurality of integral flexible energizing tabs 24, respectively, extending into the apertures 19 and disposed in contact under spring tension with the sprags 11 therein. The construction, function, and operation of the sprags 11, the cages 12 and 13, and the spring ribbon 14 are essentially identical to that described in the above mentioned copending application.

The principles of the present invention pertain more particularly to the annular bearings 15 and 16 and their use in conjunction with the clutch 10. Referring now to Fig. 2, the annular bearing 15 is formed of suitable bearing material, such as bronze, and is generally U-shaped in cross section, being formed to have integral means such as flanged lips 25 and 26 (Fig. 4) at the radially outer and inner portions thereof and which overlap the edges of the cages 12 and 13.

The flanged lip 25 has an external cylindrical surface 27 adapted to be in close bearing contact with the outer race surface 20, and the flanged lip 26 has a cylindrical surface 28 adapted to maintain bearing contact with the inner race surface 21. In practice, it is preferable that the bearings 15 and 16 maintain tighter contact with the outer race surface 20 than with the inner race surface 21. Consequently, the bearings 15 and 16 are manufactured so as to provide a slight clearance between the surface 28 and the race surface 21; this clearance is preferably of the order of magnitude of $\frac{1}{1000}$ of an inch.

The flanged lip 25 of bearing 15 has a cylindrical surface 29 opposing an outer surface 30 on the outer cage 12, and the bearing 15 also has an inner surface 31 opposing an end surface 32 of the cage 12. The spacing between the opposing surfaces is of the order of magnitude of a few thousandths of an inch; however, for purpose of illustration only, the spacing between the surfaces is exaggerated in the figures.

The flanged lip 26 of the bearing 15 has a cylindrical inner surface 33 opposing a surface 34 on the inner cage 13, and the inner surface 31 also opposes an end surface 35 on the cage 13. The spacing between these opposing surfaces is again exaggerated for purpose of illustration, but the spacing between both of these latter surfaces is greater than the spacing between the cage 12 and the adjacent surfaces of the bearing 15 for reasons that will be hereinafter explained.

Bearing 16 is substantially identical in construction to the bearing 15 having integral means such as flanged lips 36 and 37 which overlap the edges of the cages 12 and 13 in the manner of the bearing 15 but on the opposite side of the clutch 10. The flanged lip 36 has an external cylindrical surface 38 adapted to be in close bearing contact with the outer race surface 20, and the flanged lip 37 has a cylindrical surface 39 adapted to maintain bearing contact with the inner race surface 21.

The flanged lip 36 of the bearing 16 has a cylindrical inner surface 40 opposing an outer surface 41 on the outer cage 12 and the bearing 16 also has an inner surface 42 opposing an end surface 43 of the cage 12.

The flanged lip 37 of the bearing 16 has a cylindrical inner surface 44 opposing a surface 45 on the inner cage 13, and the inner surface 42 also opposes an end surface 46 on the cage 13. The relative spacing of the cages 12 and 13 with respect to the bearing 16 is substantially the same as the spacing with respect to the bearing 15.

In operation, the one-way clutch 10 is disposed between the outer race surface 20 and the inner race surface 21 so that one race will over-run with respect to the other in a desired predetermined direction. When the clutch is over-running in this fashion, the sprags 11 present a minimum radial length between the race surfaces 20 and 21. The wrinkled spring ribbon 14 functions to bias sprags 11 toward a position in which the surfaces 22 and 23 are in sliding contact with the outer and inner race surfaces 20 and 21, respectively. When the relative direction of rotation reverses, the sprags 11 tilt so as to tend to present their maximum radial length between the outer race surface 20 and the inner race surface 21 and thereby wedge between these races locking them together. The cages 12 and 13 with their apertures 17 and 18 which maintain contact with the circumferential facing sides of the sprags 11, function to maintain the sprags 11 in a phased relationship; that is, the sprags 11 are caused to tilt in unison around the entire periphery of the clutch 10. Inasmuch as the lips 25 and 26, and 36 and 37 of the bearings 15 and 16 are closely spaced with respect to the cages 12 and 13, in the event either of these cages tends to become eccentric, it will strike either lips 25 or 36 or lips 26 and 37 to the end that such eccentric cage movement is limited.

As was stated earlier, the axial spacing between the inner cage 13 and the bearings 15 and 16 is greater than the axial spacing between the outer cage 12 and the bearings 15 and 16. As a result of this construction, in the event that either or both of the bearings 15 or 16 should be accidentally moved toward the clutch 10, it will be impossible for the bearings 15 and 16 to engage both of the cages 21 and 13 simultaneously. Therefore, the cages 12 and 13 cannot be mechanically connected together through the bearings 15 and 16, and will always be free to move circumferentially relative to each other.

As a result, the sprags 11 will at all times be responsive to relative motion of the races 20 and 21 to either permit their over-running or to lock the races together.

The construction of the bearings 15 and 16 has several important advantages over the prior art structures. One advantage of the U-shaped cross-section construction is that the flanged lips overlapping the cages 12 and 13 cause the cages 12 and 13 to remain concentric with respect to the races 20 and 21, and eliminate the need for flanges on the edges of the cages 12 and 13, to accomplish this purpose.

Another advantage of this construction lies in the fact that it is possible to utilize sprags of greater axial length, with correspondingly greater clutch engaging capacity for a clutch of a given size. It is important to note that within a clutch cavity of given axial dimension, the axial space will be occupied by the sprags 11, the edges of the cages 12 and 13 and the annular bearings disposed on opposite sides of the cages 12 and 13. The spaces formerly occupied, in the prior art structures, by the bearings alone and by the edges of the cages alone are combined in the present overlapping construction, making it possible to utilize sprags of increased length due to this saving of space.

In certain applications, it is desirable that the amount of frictional drag of the cages 12 and 13 with respect to the race surfaces 20 and 21 be increased. To this end, the modifications shown in Figures 5 through 8 are illustrated which incorporate the present invention.

In the first modification, shown in Figure 5, the outer cage 12' is formed with a flanged cross bar 47 generally T-shaped in plan view as shown in Figure 6 and adapted to maintain frictional contact with the outer race surface 20. The flanged portion of T-bar 47 is separated from the cage 12' on its axial end nearest to the bearing 16 and extends through a slotted opening 48 formed in the bearing 16. The amount of frictional drag of the T-bar 47 with the outer race 20 depends upon the resiliency of the material comprising the cage 12'.

Similarly, the inner cage 13' is formed with a flanged T-bar 50 adapted to maintain frictional contact with the inner race surface 21, and this T-bar 50 extends through a slotted opening 51 formed in the bearing 16.

It is to be noted that the effect of the frictional drag of the T-bars 47 and 50 with the respective race surfaces 20 and 21 will be to tilt the sprags 11 into a disengaged position against the action of the spring ribbon 14, when the clutch 10 is over-running. The incorporation of this additional drag built into the clutch 10 has the advantage of reducing the amount of frictional wear between the race surfaces 20 and 21 and the sprags 11. Furthermore, this built in frictional drag acting through the cages 12' and 13' tends to tilt the sprags 11 into an engaged condition when the relative direction of rotation of the races reverses into a non over-running condition.

In the second modification shown in Figure 7, the frictional contact of the outer cage 12' with the outer race surfaces 20 is created in the same fashion as shown in the modification shown in Figure 5, that is, with the flanged T-bar 47 extending through the slotted opening 48 formed in the bearing 16. The frictional contact between the inner cage 13 and the inner race surface 21 is created by means of a chordal drag spring 52 attached to the inner cage 13.

The drag spring 52 is shown in Fig. 8 and is seen to comprise an angularly shaped body portion 53 and three lugs 54, 55 and 56 adapted to over-lap an edge of the inner cage 13. The lugs 54, 55, 56 of the spring 52 are adapted to engage the inner cage 13 through the apertures 18 formed in the cage 13. The spring 52 is thus fixedly attached to the inner cage 13 and frictional engagement with the inner race surface 21 is obtained due to the spring compression of the body portion 53 in contact with the race surface 21.

The primary advantage of this latter modification lies in the fact that the drag spring 52 can be made of a material such as bronze or other suitable bearing material so that the wear of the spring 52 against the inner race surface 21 is minimized. Clutches employing such drag springs are more fully described and claimed in the copending application of Carl R. Fagiano, Serial No. 648,279 filed 1957, entitled One-Way Clutch and Drag Spring. For these reasons, by the incorporation of a separate spring material such as bronze, the resiliency of which can be readily standardized and controlled, the frictional wear on the inner race surface 21 is substantially reduced.

We wish it to be understood that our invention is not to be limited to the specific constructions and arrangements shown and described, except only insofar as the claims may be so limited, as it will be understood to those skilled in the arts that changes may be made without departing from the principles of the invention.

We claim:

1. A combination one-way clutch and bearing for use with inner and outer races defining a cavity therebetween comprising a plurality of one-way engaging elements, cage means having at least the major peripheral portion thereof constructed as to be spaced from the races and having apertures through which said one-way engaging elements extend, resilient means effective to bias said engaging elements, and bearing means generally U-shaped in cross section including means disposed between said cage means and the races effective to engage and space the races.

2. A combination one-way clutch and bearing comprising a plurality of wedging elements or grippers adapted to be disposed between inner and outer races, retaining means for said wedging elements having at least the major portion thereof constructed as to be spaced from the races, and bearing means provided with integral means disposed between said retaining means and at least one of the races effective to engage and space the races.

3. A combination one-way clutch and bearing for use with inner and outer races defining a cavity therebetween comprising a plurality of one-way engaging elements, cage means comprising radially inner and outer cages having at least the major portions thereof constructed as to be spaced from the races and being relatively arcuately movable and having apertures through which said one-way engaging elements extend, resilient means effective to bias said engaging elements, and bearing means generally U-shaped in cross section including integral means disposed between said cage means and the races effective to engage and space the races.

4. A combination one-way clutch and bearing for use with inner and outer races defining a cavity therebetween, a plurality of one-way engaging elements, cage means comprising radially inner and outer cages having at least the major portions thereof constructed as to be spaced from the races and being relatively arcuately movable and having apertures through which said one-way engaging elements extend, bearing means generally U-shaped in cross section including integral means disposed between said cage means and the races effective to engage and space the races, and frictional drag means in engagement with at least one of said races and connected to at least one of said cages.

5. A combination one-way clutch and bearing for use with inner and outer races defining a cavity therebetween, a plurality of one-way engaging elements, cage means comprising radially inner and outer cages having at least the major portions thereof constructed as to be spaced from the races and being relatively arcuately movable and having apertures through which said one-way engaging elements extend, bearing means generally U-shaped in cross section including integral means disposed between said cage means and the races effective to engage and space the races, frictional drag means in engagement with at least one of said races and connected to one of said cages, and opening defining means in said bearing means through which said frictional drag means extend.

6. A combination one-way clutch and bearing for use with inner and outer races defining a cavity therebetween comprising a plurality of one-way engaging elements, cage means comprising radially inner and outer cages having at least the major portions thereof constructed as to be spaced from the races and being relatively arcuately movable and having apertures through which said one-way engaging elements extend and operable to maintain said elements in phased relationship, and annular bearing means generally U-shaped in cross section having radially spaced flanges engaging and spacing the races and disposed in overlapping relationship between said cage means and the races, said cage means extending into said bearing means between said flanges.

References Cited in the file of this patent

UNITED STATES PATENTS

| 2,366,842 | Dodge et al. | Jan. 9, 1945 |
| 2,404,221 | Dodge | July 16, 1946 |
| 2,724,472 | Swenson | Nov. 22, 1955 |
| 2,832,450 | Wade | Apr. 29, 1958 |

FOREIGN PATENTS

| 1,095,050 | France | Dec. 15, 1954 |